United States Patent [19]
Gast

[11] 3,958,882
[45] May 25, 1976

[54] SAMPLE CHAMBER FOR AN OPTICAL SPECTROMETER

[75] Inventor: Jurgen Gast, Forchheim, Germany

[73] Assignee: Bruker-Physik AG, Germany

[22] Filed: May 22, 1974

[21] Appl. No.: 471,847

[30] Foreign Application Priority Data
May 24, 1973 Germany............................ 2326379

[52] U.S. Cl................................. 356/73; 356/201; 356/209
[51] Int. Cl.²......................................... G01N 21/00
[58] Field of Search ............... 356/73, 88, 201, 205, 356/209, 211, 212

[56] References Cited
UNITED STATES PATENTS

| 3,402,634 | 9/1968 | Bennett............................ 356/201 X |
| 3,542,480 | 11/1970 | Ford.................................... 356/205 |
| 3,687,519 | 8/1972 | Mapes............................ 356/201 X |

Primary Examiner—James B. Mullins
Attorney, Agent, or Firm—Pennie & Edmonds

[57] ABSTRACT

A sample chamber for an optical spectrometer comprising means for selecting one of two modes of operation: a transmission mode or a reflection mode. The mode-selecting means comprise optical elements for switching the path of the optical beam passing through the sample chamber so that the beam either passes through a sample or is incident upon and reflects off of a surface of a sample. Coupled to the path-selecting means are means for moving a sample to the position and orientation relative to the optical beam which is appropriate to the mode of operation selected.

13 Claims, 5 Drawing Figures

SAMPLE CHAMBER FOR AN OPTICAL SPECTROMETER

BACKGROUND OF THE INVENTION

This invention relates to a sample chamber for an optical spectrometer. Particular embodiments of the invention disclosed are sample chambers for an infrared Fourier-transform spectrometer which can maintain samples and infrared beams in a vacuum.

Optical spectrometers measure the fraction of energy absorbed by a sample of material from a beam of optical radiation as a function of the frequency of the radiation. As used herein the term "optical beam" refers to a beam of electromagnetic radiation whose frequency spectrum lies in the infrared, visible and ultraviolet ranges. The energy absorbed by samples may be studied in two different ways by measuring either the transmittance or reflectance of the sample. In a transmission experiment the optical beam is passed through the sample and energy absorbed from the beam is detected by comparing the intensity of the beam impinging upon the sample to the intensity of the beam passing out of the sample. In a reflection experiment the energy absorbed by the sample is determined by comparing the intensity of a beam impinging upon a surface of the sample to the intensity of the beam reflected from the surface. Reflectance measurements are usually made on solid samples, while transmittance measurements are commonly made on both solids and fluids.

In designing sample chambers for use in making these two types of measurements, attention must be paid to the orientation of the sample relative to the beam. Ordinarily a sample, be it a solid or fluid, is prepared or confined so that the surface on which the beam impinges is flat. The angle between the direction of propagation of the optical beam and the perpendicular to the surface on which the beam impinges is called the angle of incidence. For transmission measurements the sample is ordinarily oriented so that the angle of incidence is zero degrees. If the beam impinges upon a sample with an angle greater than zero degrees, then in passing through the sample the axis of the beam will be displaced. The amount of displacement depends upon the thickness of the sample, the index of refraction of the sample, and the angle of incidence. Such a displacement of the beam is undesirable because the optics of the spectrometer must be realigned to compensate for the displacement. When the angle of incidence of the beam is zero degrees, the beam passing from the sample is not displaced. For this reason sample chambers for use in transmission studies are designed so that samples are oriented to make the angle of incidence zero degrees. For reflectance measurements, however, the angle of incidence cannot be zero degrees. If it were, the reflected beam would coincide with the incident beam and it would be difficult to separate the two. Sample chambers for use in reflectance measurements are for this reason designed with the angle of incidence of the beam greater than zero degrees.

It is desirable to use the same spectrometer for both transmission and reflection measurements. Moreover it is useful to be able to make the changeover between these two modes of operation quickly and easily. Making this changeover, however, can be troublesome with certain spectrometers; particularly, those which operate in a vacuum or a special atmosphere. Changing the mode of operation of the spectrometer requires changing the path of the beam and often involves changing the orientation of the sample. These two procedures often involve opening the sample chamber, which in the case of vacuum spectrometers is a time-consuming and troublesome procedure because the vacuum seal must be broken, the sample chamber vented to the atmosphere, the changeover made, then the chamber must be resealed and reevacuated.

SUMMARY OF THE INVENTION

To avoid such problems the present invention contemplates sample chambers which may be readily switched between transmission and reflection modes of operation. The changeover between modes is accomplished by changing the path of the beam in the chamber and by simultaneously changing the position and orientation of the samples in such a way that the angle of incidence of the beam on the samples is an appropriate value for the type of measurement being made.

In preferred embodiments of the invention the optical elements in the sample chamber are arranged so that the focal point of the optical beam falls upon the sample. In this way the diameter of the optical beam has its smallest value at the sample position and therefore small samples may be studied conveniently.

In one preferred embodiment of the invention the focal point for the beam is at the same location in both the reflection and transmission modes of operation. To switch between modes the sample need only be rotated to obtain the appropriate angle of incidence. The sample need not be translated since the focal point of the beam falls on the same spot for reflection and transmission modes of operation. Rotating the sample is accomplished by mounting the sample on a rotatable platform which is coupled to the mechanism which shifts the path of the beam. This mechanism consists of a pair of mirrors which may be moved into or out of the path of the beam. When the mirrors are in the path of the beam the beam is deflected to a number of other mirrors which focus the beam on a surface of the sample and route the reflected beam through the output port of the sample chamber. When the mirrors are not in the path of the beam the beam is focused on the sample and the portion of the beam which passes through the sample proceeds out through the same output port. The mechanism which shifts the mirrors between the two positions is coupled to the rotatable platform in such a way that the changing between the transmission and reflection modes of operation simultaneously shifts the mirrors and rotates the sample to the appropriate operation. Thus the sample chamber may be used for either transmission or reflection measurements and moreover the changeover between these two modes can be accomplished quickly. There is no need to open the chamber to make the changeover and thus this sample chamber is particularly suited for samples which must be maintained in a vacuum or in a special atmosphere. A sample may be sealed in the chamber and both its reflectance and transmittance spectra measured without having to open the sample chamber or break the vacuum seal.

This preferred embodiment of the invention provides for a second chamber for holding a reference sample, the second chamber being optically identical to the first chamber. In this way the spectrum of one sample may be readily compared to the spectrum of a second sample. Both the reflection and the transmission spectra of the reference sample may be recorded. The changeover between these two modes is accomplished in the same way as the changeover in the first sample chamber. In fact the changeover mechanisms in the two chambers may be coupled so that both are always in the same mode of operation. It is not necessary, however, to couple the two chambers in this way.

In a second preferred embodiment of the invention a series of four sample chambers are arranged side by side in the form of a slide. Each of these sample chambers, hereafter referred to as subchambers, separately contain input and output ports, a sample holder, and optical elements appropriate for either transmission or reflection operation. One pair of subchambers are provided for reflection measurements and the second pair for transmission measurements. The reflection and transmission subchambers are alternated in sequence so that, for example, the order of the subchambers may be as follows: reflection, transmission, reflection, transmission. The transmission subchamber is smaller than the reflection subchamber because fewer optical elements are required. By alternating the order of the subchambers, the distance between the input (or output) ports of the two transmission subchambers may be made equal to the distance between the input (or output) ports of the two reflection subchambers, even though the transmission subchambers may be narrower than the reflection subchambers. One of the reflection subchambers serves to hold a reference sample, as does one of the transmission subchambers. Each of the subchambers contains an input port and an output port on opposite sides of the subchamber. These input and output ports may be aligned with corresponding input and output ports on the spectrometer. The spectrometer has two output ports and two input ports, one pair of input and output ports to be used by the reference sample and the other pair by the sample. The subchambers may be placed in position in the spectrometer so that the optical beam will pass either through a sample subchamber or the corresponding reference-sample subchamber. Changing the mode of operation of the spectrometer from transmission to reflection is simply a matter of sliding the four subchambers from one position to another so that the appropriate subchambers are aligned with the input and output ports of the spectrometer. This simple method of changing between reflection and transmission modes of operation is possible because the distances between the input ports on the two transmission subchambers equals the corresponding distance for the two reflection subchambers and similarly for the output ports. Thus with this embodiment the mode of operation of the spectrometer may be quickly and easily changed even though the subchambers are sealed and evacuated.

Various arrangements of optical elements are possible for the reflection chambers of this invention. Deflecting mirrors are usually provided at the input and output ports for the optical beam, these mirrors normally being plane mirrors. In preferred embodiments of this invention, ellipsoidal mirrors are also provided for the incoming and outgoing optical beams, with one focal point located on the surface of the sample. Reflection chambers of this type have the fewest number of mirrors. Chambers of this type of design are therefore advantageous because they can be produced most economically.

In some embodiments of the reflection chambers, a second pair of plane mirrors are provided for the incoming and outgoing optical beams. These plane mirrors are located on one side of the sample, opposite from the ellipsoidal mirrors. Because of this roughly symmetrical arrangement, it is possible to have chambers and mirrors with small dimensions and still have a relatively large space available for the sample. Thus bulky cryostats and other apparatus may easily be placed in the sample chamber for experiments which require them.

In other embodiments of the invention, mirrors are arranged in the reflection chambers such that the angles of incidence between the optical beam and the plane mirrors are less than approximately 20°. In these embodiments, the sample is no longer located midway between the ellipsoidal mirrors and the plane mirrors and the dimensions of the chamber are somewhat greater than the dimensions of the more symmetrical chambers. However, the optical conditions are more favorable because of the relatively steep angle (i.e., almost perpendicular) the beam makes with the mirrors. Polarization effects are minimized and the mirrors may have smaller dimensions.

In all of the embodiments the angle of incidence of the beam on the reflection sample may be made very small (approximately 10°) and the diameter of the beam at the focal point is approximately the same in the reflection mode as in the transmission mode. Only very slight polarization of the beam occurs.

BRIEF DESCRIPTION OF THE DRAWINGS

These and other objects, features, and elements of the invention will become more readily apparent in the following detailed description of the drawings.

DETAILED DESCRIPTION OF THE DRAWINGS

Figure 1:
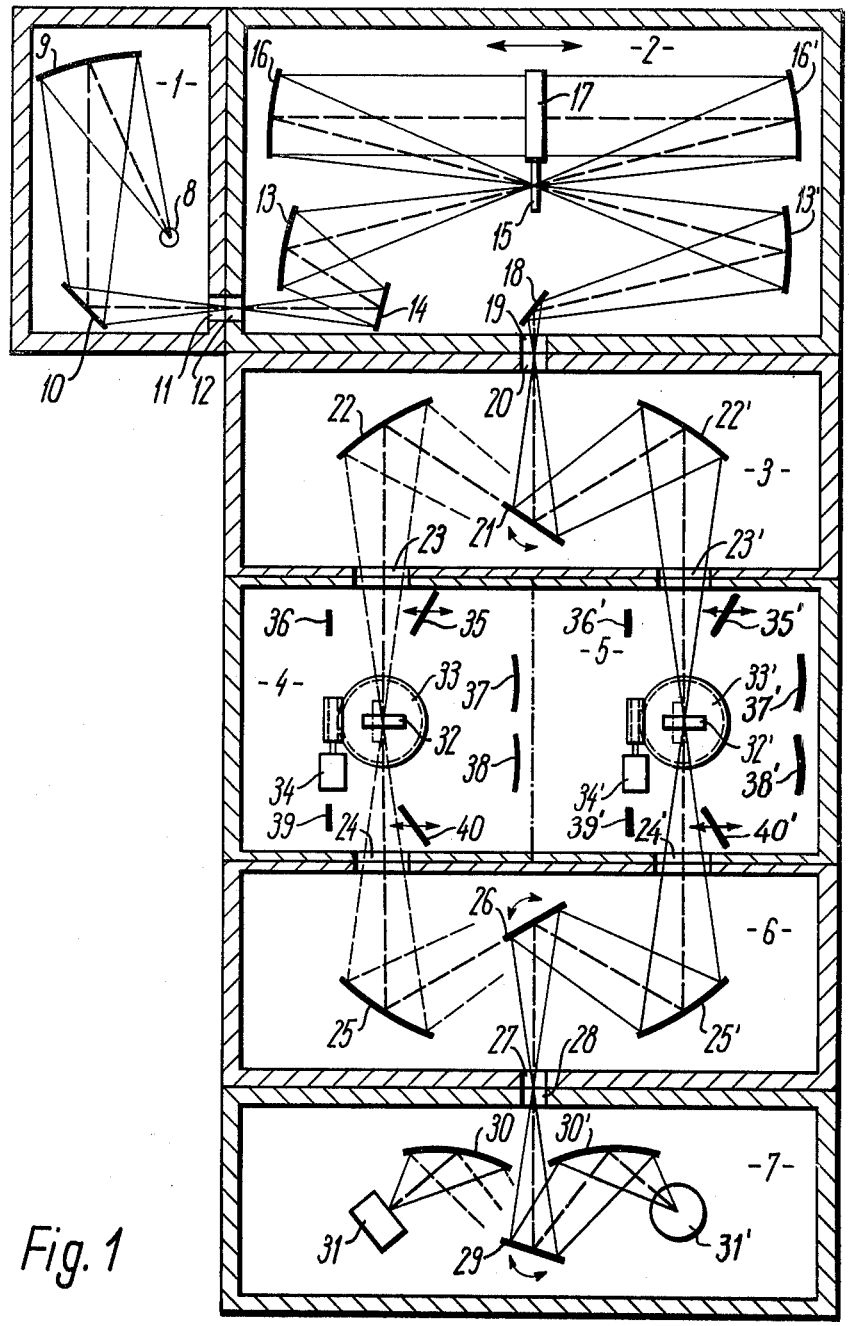
FIG. 1 depicts an illustrative embodiment of the invention as part of an infrared Fourier-transform spectrometer. The electronic and recording elements of the spectrometer are not necessary to appreciate the invention and are not shown. The invention is depicted in the transmission mode of operation.

The spectrometer depicted in FIG. 1 comprises six modules: module 1 containing a source of an optical beam, module 2 containing an interferometer, modules 3 and 6 containing mirrors for selecting either the sample or the reference sample, module 7 containing an optical detector, and the remaining module, comprising chambers 4 and 5, containing holders for the sample and the reference sample.

Module 1 is provided with a source of infrared radiation: source 8. A spherical mirror 9 reflects the beam originating from source 8 onto a stationary plane mirror 10, which in turn reflects the beam out through a windowed output port 11 in module 1. Spherical mirror 9 is shaped and positioned so that its focal point is located in the plane of the outer surface of module 1 or just outside of this plane.

A windowed input port 12 is located in module 2 just opposite port 11 of module 1. Module 2 contains an ellipsoidal mirror 13 whose focal point coincides with the focal point of spherical mirror 9. In order to locate ellipsoidal mirror 13 near the wall of module 2, a plane deflecting mirror 14 is provided in module 2. The second focal point of ellipsoidal mirror 13 is located an a beam splitter 15. Thus the infrared beam from spherical mirror 9 is focused by ellipsoidal mirror 13 onto beam-splitter 15. Beam splitter 15 is an amplitude-dividing beam splitter of the type commonly used in infrared interferometers. Beam splitter 15 is located at the focal point of an extra-axial parabolic mirror 16. The beam splitter 15 reflects half of the infrared beam to parabolic mirror 16, which forms the beam into a parallel beam and sends it to a reflecting surface of a double plane mirror 17. Double plane mirror 17 may be moved by measurable amounts in the direction parallel to the direction of propagation of the beam falling upon it in order to vary the phase characteristic of the beam reflected by the beam splitter 15 relative to the portion of the beam which passes through the beam splitter.

The portion of the beam allowed to pass by the beam splitter 15 strikes an extra-axial parabolic mirror 16', which is positioned symmetrically with respect to parabolic mirror 16, the plane of symmetry being defined by the plane of beam splitter 15. Similarly, an ellipsoidal mirror 13' is provided symmetrically to ellipsoidal mirror 13. The interferometer of module 2 is thus constructed in the manner of a mirror image. The beam reflected by the two plane mirror surfaces of the double plane mirror 17 is partly transmitted by beam splitter 15 and partly reflected. The two portions are guided by way of ellipsoidal mirror 13' to a stationary plane deflecting mirror 18, which reflects the beam out of the module 2 through a windowed output port 19. The beam is focused to a point located in or slightly outside the surface plane of the adjacent wall of the module 2.

Provided adjacent to port 19 of module 2 is a windowed input port 20 of module 3. Modules 3 and 6 are constructed in an identical manner. Each comprises a plane folding mirror 21, (26) which may be moved into two positions by a common actuating mechanism which is not shown. Symmetrical, extra-axial ellipsoidal mirrors 22, (25) and 22', (25') are provided. In one position of the folding mirror 21, the beam entering through the window 20 is directed to ellipsoidal mirror 22, in the other position, to ellipsoidal mirror 22'. The beam which is reflected by one of the two ellipsoidal mirrors 22, 22', is focused either in chamber 4 or chamber 5, depending on the position of mirror 21. Chamber 4 contains a sample 32 and chamber 5 contains a reference sample 32'. The beam passing through the sample or reference chambers strikes against symmetrical ellipsoidal mirrors 25 or 25', which reflect the beam outwards by way of the folding mirror 26, through a windowed output port 27. The shape and arrangement of the ellipsoidal mirrors 22, 22' and 25, 25' are such that the incoming beam focuses either at a point on sample 32 or on sample 32' and the beams leaving either of these points focus at a point which is located in or somewhat outside the surface plane of the wall of the module 6 in which port 27 is located.

Adjoining module 6, from which the beam is projected, is module 7, into which the beam passes through a windowed input port 28. The beam there strikes a movable plane mirror 29 which, depending upon its position, directs the beam by way of an ellipsoidal mirror 30 to an infrared detector 31, or by way of ellipsoidal mirror 30' to another infrared detector 31'. The two infrared detectors 31, 31' and the two ellipsoidal mirrors 30, 30' are arranged symmetrically with respect to the axis of the incoming beam.

If it is desired to maintain the optical beam of the spectrometer substantially in a vacuum, the ports in the modules may be covered with suitable transparent windows sealed to the enclosure and each module may be individually evacuated. A second way of evacuating the system may also be used. The modules making up the system may be sealed together and the entire system evacuated as a unit. In this way the ports may be left uncovered, which may be advantageous if suitable material for windows is difficult to find.

In the embodiment of chambers 4 and 5 illustrated in FIG. 1, the samples 32, 32' are located on rotatable platforms 33, 33' which are able to rotate through 90° by means of pivot drives 34, 34'. Connected to the pivot drive are displacement drives (not shown) for plane deflecting mirrors 35 of the chamber 4 and 35' of the chamber 5. If sample 32 is in the orientation shown, then deflecting mirror 35 is in the position shown. In this arrangement the sample chamber is operating in the transmission mode. If sample 32 is moved through 90° by rotatable platform 33, then the deflecting mirror 35 is brought into the path of the beam so that it deflects the incoming beam via a second stationary deflecting mirror 36 to an ellipsoidal mirror 37. One focal point of ellipsoidal mirror 37 is located on the surface of sample 32. This point is at the same position as the focal point of ellipsoidal mirror 22. The other focal point of ellipsoidal mirror 37 is located between ellipsoidal mirror 37 and deflecting mirror 36. Mirrors for the outgoing, reflected beam are arranged symmetrically with respect to the mirrors for the incoming beam. Ellipsoidal mirror 38 is adjacent to its corresponding ellipsoidal mirror 37. A stationary deflecting mirror 39 corresponds to deflecting mirror 36. Deflecting mirror 40 corresponds to deflecting mirror 35 and moves in conjunction with it. Thus mirrors 38, 39 and 40 for the reflected beam leaving the chamber correspond to the mirrors 37, 36, 35 for the beam entering the chamber. Seen from the chambers 3 and 6, chamber 4 appears the same when operated in either the transmission or reflection modes. The direction of the outgoing and incoming beam as well as the aperture angle are the same. In order to focus the beam on the sample, mirrors 36 and 39 as well as mirrors 37 and 38 may be displaceable in the direction of the vertical to their surfaces. The same optical arrangement is provided in chamber 5 for the reference sample.

Figure 2:
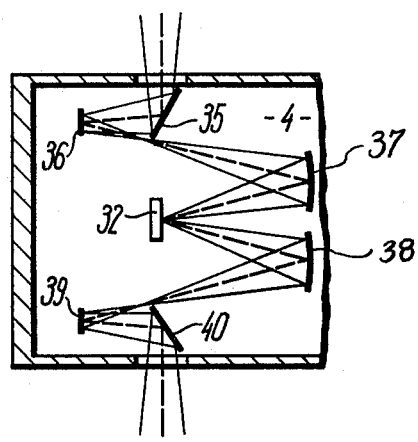
FIG. 2 depicts a subchamber of an alternative embodiment of a sample chamber in the reflection mode of operation.

FIG. 2 shows a reflection subchamber which is similar to chambers 4 and 5 in FIG. 1 except that mirrors 35 and 40 are not displaceable in FIG. 2, but rather are fixed in the path of the optical beam. In addition there is no rotatable platform for sample 32, rather the sample is fixed in an orientation appropriate for reflectance measurements. This chamber may be employed in an embodiment of the invention in which two pairs of transmission and reflection subchambers are arranged side by side in a linear fashion with transmission and reflection subchambers alternating. The subchambers for transmission are identical to chamber 4 of FIG. 1 from which mirrors 35, 36, 37, 39 and 40 have been removed, together with rotatable platform 33 and pivot dirve 34. Subchambers for transmission measurements can be made much smaller than the reflection subchamber depicted in FIG. 2. This arrangement of four subchambers may be moved so that either the reflection chambers or transmission chambers are located in the operating position aligned with windows 23 and 23' of chamber 3.

Figure 3:
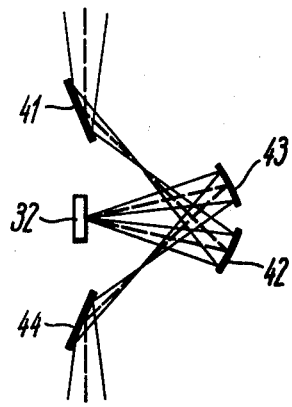
FIG. 3 depicts a subchamber, which uses only a single pair of plane mirrors.

FIG. 3 shows the path of a beam through a reflection subchamber, in which only one pair of plane deflecting mirrors is used. The beam enters the subchamber through an input port, which is not shown, impinges upon plane deflecting mirror 41, from which it is reflected to ellipsoidal mirror 42. One focal point of ellipsoidal mirror 42 is located between it and deflecting mirror 41 and the other focal point is located on sample 32. Similarly, the reflected beam is directed to an output port (not shown) by ellipsoidal mirror 43, arranged symmetrically with respect to ellipsoidal mirror 42, and plane deflecting mirror 44, arranged symmetrically with respect to the deflecting mirror 41.

Figure 4:
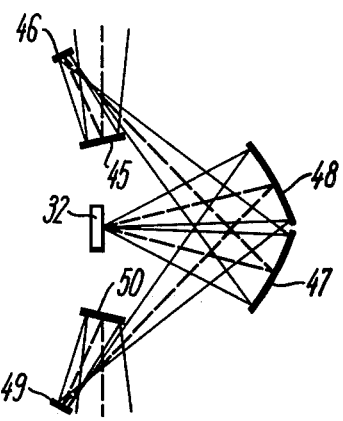
FIG. 4 depicts subchamber in which the optical beam is incident upon the plane mirrors at a very steep angle.

FIG. 4 depicts the path of a beam through another possible reflection subchamber. The incoming beam is incident upon stationary deflecting mirror 45 at a very steep angle. It is then reflected to a second stationary deflecting mirror 46, upon which it is also incident at a steep angle. From mirror 46 the beam is reflected to ellipsoidal mirror 47. One focal point of the ellipsoidal mirror 47 is located in the vicinity of the deflecting mirror 46, and the other focal point is located on the surface of sample 32. The reflected beam is similarly guided out of the subchamber by way of ellipsoidal mirror 48, deflecting mirror 49, and deflecting mirror 50.

Figure 5:
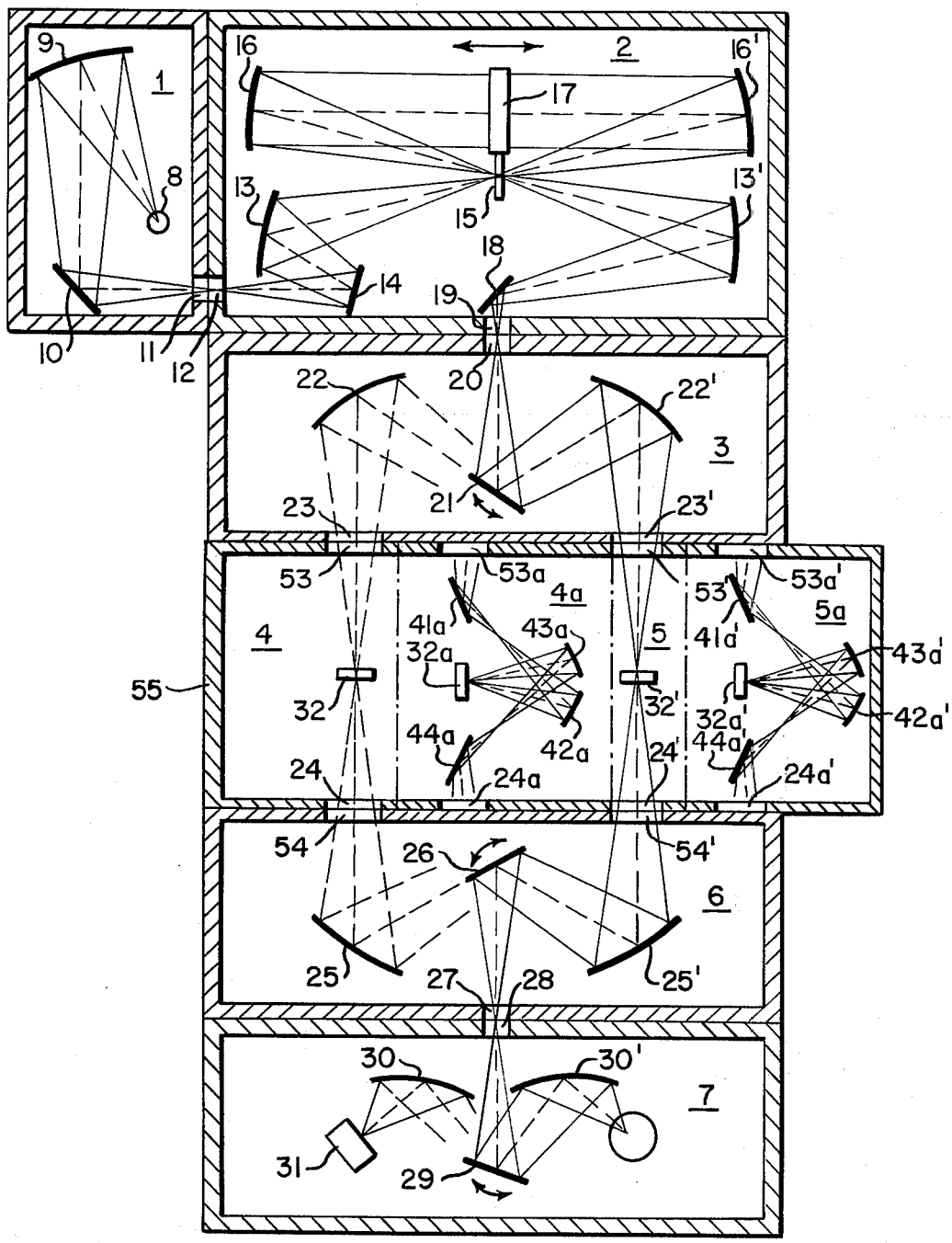
FIG. 5 depicts an infrared Fourier-transform spectrometer employing a series of four sample chambers arranged side by side in the form of a slide.

FIG. 5 depicts a spectrometer which is identical to the embodiment shown in FIG. 1 except for changes in modules 3, 4 and 5 of FIG. 1. For convenience, only those features of the spectrometer of FIG. 5 which differ from those of the spectrometer of FIG. 1 will be described below. A sample chamber slide 55 consists of a first transmission subchamber 4, a first reflection subchamber 4a, a second transmission subchamber 5, and a second reflection subchamber 5a joined together side by side in a linear arrangement with reflection and transmission subchambers alternating in sequence. First transmission subchamber 4 has an input port 53 and an output port 24 through which an optical beam may pass. Input port 53 is aligned with output port 23 of module 3 and output port 24 is aligned with an input port 54 of module 6. A sample 32 is held in the path of the optical beam in the subchamber such that the optical beam entering through the input port 53 may pass through the sample and subsequently exit through the output port 24. Adjoining transmission subchamber 4 is first reflection subchamber 4a, which has an input port 53a and an output port 24a through which an optical beam may pass located on opposite sides of the subchamber. Plane mirror 41a and ellipsoidal mirror 42a direct an optical beam passing through input port 53a to a surface of sample 32a as described in connection with FIG. 3. Ellipsoidal mirror 43a and plane mirror 44a direct the optical beam reflected from the surface of sample 32a through the output port 24a. The second transmission subchamber 5 adjoins first reflection subchamber 4a and has an input port 53' and an output port 24' through which an optical beam may pass respectively aligned with output port 23' of module 3 and an input port 54' of module 6. Reference sample 32' is held in the path of the optical beam in the subchamber, such that the optical beam entering through input port 53' may pass through sample 32' and subsequently exit through output port 24'. The second reflection subchamber 5a adjoins the second transmission subchamber 5 and has an input port 53a' and an output port 24a' through which an optical beam may pass located on opposite sides of the subchamber. Plane mirror 41a' and ellipsoidal mirror 42a' direct the optical beam passing through input port 53a' to a surface of a reference sample 32a'. An ellipsoidal mirror 43a' and a planar mirror 44a' direct the optical beam reflected from the surface of reference sample 32a' through output port 24a'.

In FIG. 5, slide 55 is shown positioned with its left-hand side flush with the left-hand side of module 6, which aligns input ports 53 and 53' of the two transmission subchambers 4 and 5 respectively with output ports 23 and 23' of module 3. Similarly, output ports 24 and 24' of the transmission subchambers are aligned with input ports 54 and 54' of module 6. Thus the spectrometer is shown in the transmission mode of operation. Alternatively, slide 55 may be positioned with its right-hand side flush with the right-hand side of module 6, in which case input ports 53a and 53a' of the two reflection subchambers 4a and 5a are respectively aligned with output ports 23 and 23', module 3 and output ports 24a and 24a' of the reflection subchambers are aligned with input ports 54 and 54' of module 6. When slide 55 is positioned with its right-hand side flush with the right-hand side of module 6, the spectrometer operates in a reflection mode. Thus by positioning slide 55, the transmission or reflection mode of operation in the optical spectrometer may be selected.

As will be obvious to those skilled in the art numerous modifications may be made to the preferred embodiment described and illustrated herein without departing from the invention as defined in the claims.

I claim:

1. A sample chamber for an optical spectrometer comprising:
   a. an input port and an output port through which an optical beam may pass;
   b. means for holding at least one sample in the chamber;
   c. means for selecting one of two modes of operation of the chamber, a transmission mode and a reflection mode, the mode-selecting means comprising:
      i. means for directing the optical beam along one of two paths through the chamber corresponding to the mode of operation selected;
      ii. means for moving the sample to an orientation relative to the path of the optical beam such that in the transmission mode the optical beam passes into the input port, through the sample, and out of the output port and in the reflection mode the optical beam passes into the input port, impinges upon a surface of the sample, is reflected from said surface, and passes out of the output port; and
      iii. means coupling the beam-directing means and the sample-moving means so that changing the mode of operation automatically switches the path of the beam and moves the sample.

2. The apparatus according to claim 1 further comprising means for providing that the optical beam has focal points located at the same position in both the transmission and reflection modes, said position in the vicinity of the sample-holding means.

3. The apparatus according to claim 2 in which the sample-moving means provide for rotating the sample by 90° upon changing the mode of operation.

4. The apparatus according to claim 1 further comprising:
a first ellipsoidal mirror and a second ellipsoidal mirror,
means for directing the beam passing through the input port to impinge upon the first ellipsoidal mirror,
the first ellipsoidal mirror having one focal point at a location on a surface of the sample and a second focal point coinciding with a focal point of the beam impinging upon it, and
the second ellipsoidal mirror having one focal point at the same location on the surface of the sample and a second focal point coinciding with a focal point of the beam passing out of the output port.

5. The apparatus according to claim 4 further comprising:
a pair of plane mirrors;
means for directing the beam passing through the input port upon one of said mirrors and means for directing the beam passing through the output port upon the other of said mirrors; and
said plane mirrors disposed on one side of the sample and the ellipsoidal mirrors disposed on the other side.

6. The apparatus according to claim 5 in which the beams incident upon the plane mirrors have an angle of incidence with respect to the mirrors of less than approximately 20°.

7. The apparatus according to claim 1 in which the beam incident upon a flat surface of a sample in the reflection mode of operation has an angle of incidence of less than approximately 20° with respect to the surface.

8. A sample chamber for an optical spectrometer comprising:
a. a first subchamber, suitable for transmission measurements, comprising:
an input port and an output port through which an optical beam may pass, and
means for holding a sample in the path of the optical beam in the subchamber such that the optical beam entering through the input port may pass through the sample and subsequently exit through the output port;
b. a second subchamber, suitable for reflection measurements, rigidly joined to the first subchamber, comprising:
an input port and an output port through which an optical beam may pass,
means for holding a sample in the subchamber,
means for directing the optical beam passing through the input port to a surface of the sample, and
means for directing the optical beam reflected from the surface through the output port;
c. means for selecting the mode of operation by positioning the two subchambers in the optical spectrometer so that the optical beam passes through a selected subchamber.

9. The apparatus according to claim 8 further comprising:
a. a third subchamber, suitable for transmission measurements, comprising:
an input port and an output port through which an optical beam may pass, and
means for holding a reference sample in the path of the optical beam in the subchamber such that the optical beam entering through the input port may pass through the sample and subsequently exit through the output port;
b. a fourth subchamber, suitable for reflection measurements, comprising:
an input port and an output port through which an optical beam may pass,
means for holding a reference sample in the subchamber,
means for directing the optical beam passing through the input port to a surface of the reference sample, and
means for directing the optical beam reflected from the surface through the output port;
c. means joining the four subchambers together side-by-side in a linear arrangement, with reflection and transmission subchambers alternating in the sequence;
d. means for selecting the mode of operation by positioning the four subchambers in the optical spectrometer.

10. The apparatus according to claim 9 further comprising:
a first ellipsoidal mirror and a second ellipsoidal mirror;
means for directing the beam passing through the input port to impinge upon the first ellipsoidal mirror,
the first ellipsoidal mirror having one focal point at a location on a surface of a sample and a second focal point coinciding with a focal point of the beam impinging upon it, and
the second ellipsoidal mirror having one focal point at the same location on the surface of the sample and a second focal point coinciding with a focal point of the beam passing out of the output port.

11. The apparatus according to claim 10 further comprising:
a pair of plane mirrors;
means for directing the beam passing through the input port upon one of said mirrors and means for directing the beam passing through the output port upon the other of said mirrors; and
said plane mirrors disposed on one side of the sample and the ellipsoidal mirrors disposed on the other side.

12. The apparatus according to claim 11 in which the beams incident upon the plane mirrors have an angle of incidence with respect to the mirrors of less than approximately 20°.

13. The apparatus according to claim 8 in which the beam incident upon a flat surface of a sample in the reflection mode of operation has an angle of incidence of less than approximately 20° with respect to the surface.

* * * * *

UNITED STATES PATENT AND TRADEMARK OFFICE
CERTIFICATE OF CORRECTION

PATENT NO. : 3,958,882
DATED : May 25, 1976
INVENTOR(S) : JÜRGEN GAST

It is certified that error appears in the above-identified patent and that said Letters Patent are hereby corrected as shown below:

In Column 4, line 43, "; and" should read --;--.

In Column 4, line 45, "." should read --; and--.

In Column 5, line 5, "located an a" should read --located on a--.

In Column 6, line 67, "dirve" should read --drive--.

In Column 8, line 3, "53a" should read --53a'--.

Signed and Sealed this

Fourteenth Day of September 1976

[SEAL]

Attest:

RUTH C. MASON
Attesting Officer

C. MARSHALL DANN
Commissioner of Patents and Trademarks